(12) United States Patent
Ledenev et al.

(10) Patent No.: US 6,545,450 B1
(45) Date of Patent: Apr. 8, 2003

(54) MULTIPLE POWER CONVERTER SYSTEM USING COMBINING TRANSFORMERS

(75) Inventors: Anatoli V. Ledenev, Fort Collins, CO (US); Gennady G. Gurov, Fort Collins, CO (US); Robert M. Porter, Livermore, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 0 days.

(21) Appl. No.: 09/641,584

(22) Filed: Aug. 18, 2000

Related U.S. Application Data

(63) Continuation-in-part of application No. 09/584,412, filed on May 31, 2000.
(60) Provisional application No. 60/142,102, filed on Jul. 2, 1999, and provisional application No. 60/144,342, filed on Jul. 16, 1999.

(51) Int. Cl.[7] .................................................. G05F 1/40
(52) U.S. Cl. ......................................... 323/272; 363/65
(58) Field of Search .................... 363/132, 65; 323/272, 323/271, 282

(56) References Cited

U.S. PATENT DOCUMENTS

| | | | |
|---|---|---|---|
| 5,204,809 A | 4/1993 | Andresen | 363/132 |
| 5,877,611 A | 3/1999 | Brkovic | 323/222 |
| 6,052,790 A | * 4/2000 | Brown | 713/300 |
| 6,094,038 A | 7/2000 | Lethellier | 323/282 |
| 6,215,290 B1 | 4/2001 | Yang et al. | 323/282 |
| 6,292,378 B1 | 9/2001 | Brooks et al. | 363/65 |
| 6,362,986 B1 | 3/2002 | Schultz et al. | 363/132 |

OTHER PUBLICATIONS

Martin, H., et al, "Improved Mutli–Phase Coupled Inductor Topologies", HFPC Proceedings, May 1992, pp. 340–349.
Jieli Li, Charles Sullivan, and Aaron Schultz, "Coupled–Inductor Design Optimization for Fast–Response Low–Voltage DC–DC Converters", IEEE, Thayer School of Engineering, Dartmouth College, 7 pages, 2002, Mar.

"Investigating Coupling Inductors in the Interleaving QSW VRW", Pit–Leong, Qiaoqiao Wu, Peng Xu, Bo Yang and Fred C. Lee, Document prepared for the Center for Power Electronics Systems, Virginia Polytechnic Institute and State University, Blacksburg, VA 24061, Mar. 2000.

"A Novel Modeling Concept for Multi–coupling Core Structures", Pit–Leong Wong, Fred C. Lee, Xiaochuan Jia and Daan van Wyk—Document prepared for the Center for Power Electronics Systems, Virginia Polytechnic Institute and State University, Blacksburg, VA 24061, Mar. 2001.

"A Novel Integrated current Doubler Rectifier", Peng Xu, Qiaoqiao Wu, Pit–Leong Wong and Fred C. Lee, Document prepared for the Center for Power Electronics Systems, Virginia Polytechnic Institute and State University, Blacksburg, VA 24061, Feb. 2000.

International Preliminary Examination Report for PCT/US01/25749.

* cited by examiner

*Primary Examiner*—Michel Sherry
*Assistant Examiner*—Gary L. Laxton
(74) *Attorney, Agent, or Firm*—Santangelo Law Offices, P.C.

(57) ABSTRACT

Methods and circuitry for combining the outputs of multiphase power converters which greatly improves the transient response of the power conversion system are presented in a variety of embodiments. Transformers may be used to accomplish the combining function, and with properly phased and connected windings it is possible to achieve a great reduction in output ripple current and a simultaneous reduction in transistor ripple current, which give the designer freedom to reduce the value of the system output inductor, improving transient response.

10 Claims, 13 Drawing Sheets

Four Phase Power Converter

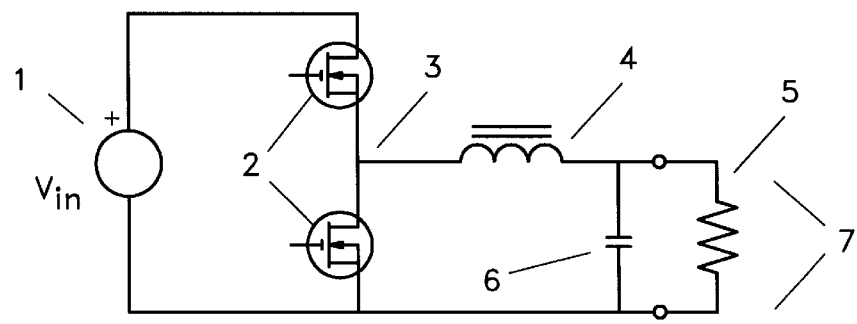
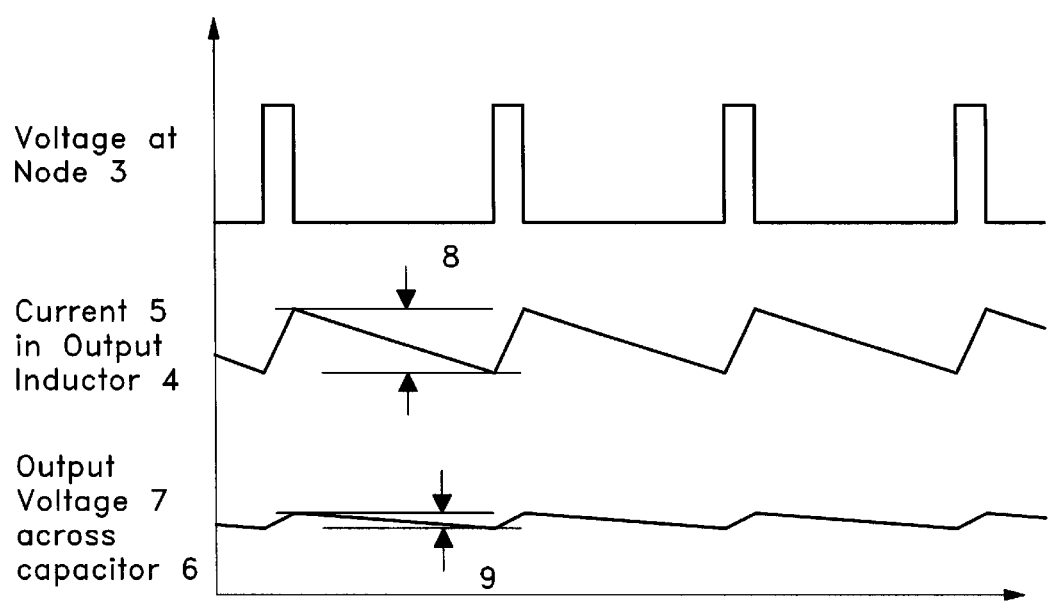
Figure 1 — Buck Converter (Prior Art) and waveforms

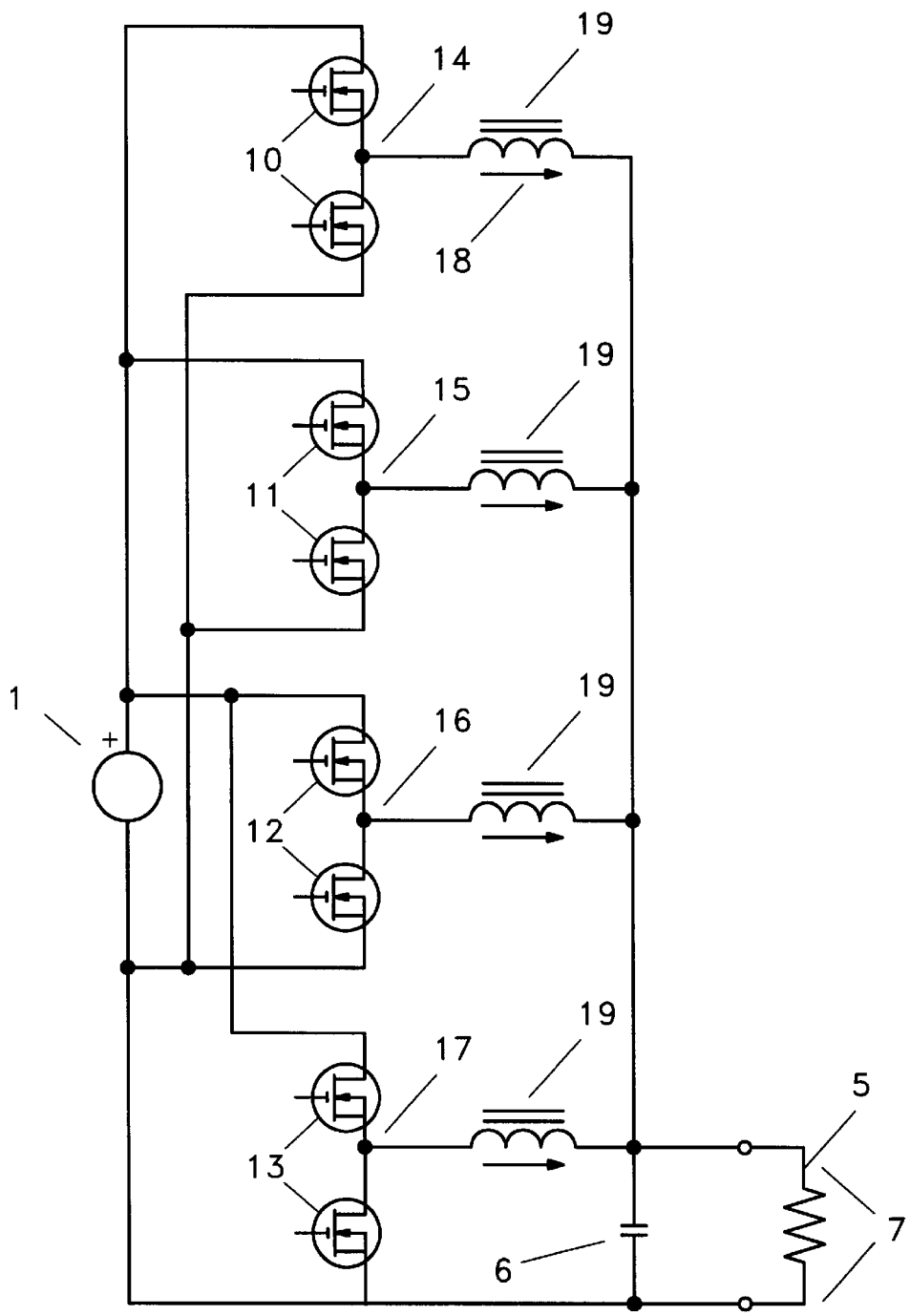
Figure 2 — Conventional Four Phase Converter (Prior Art)

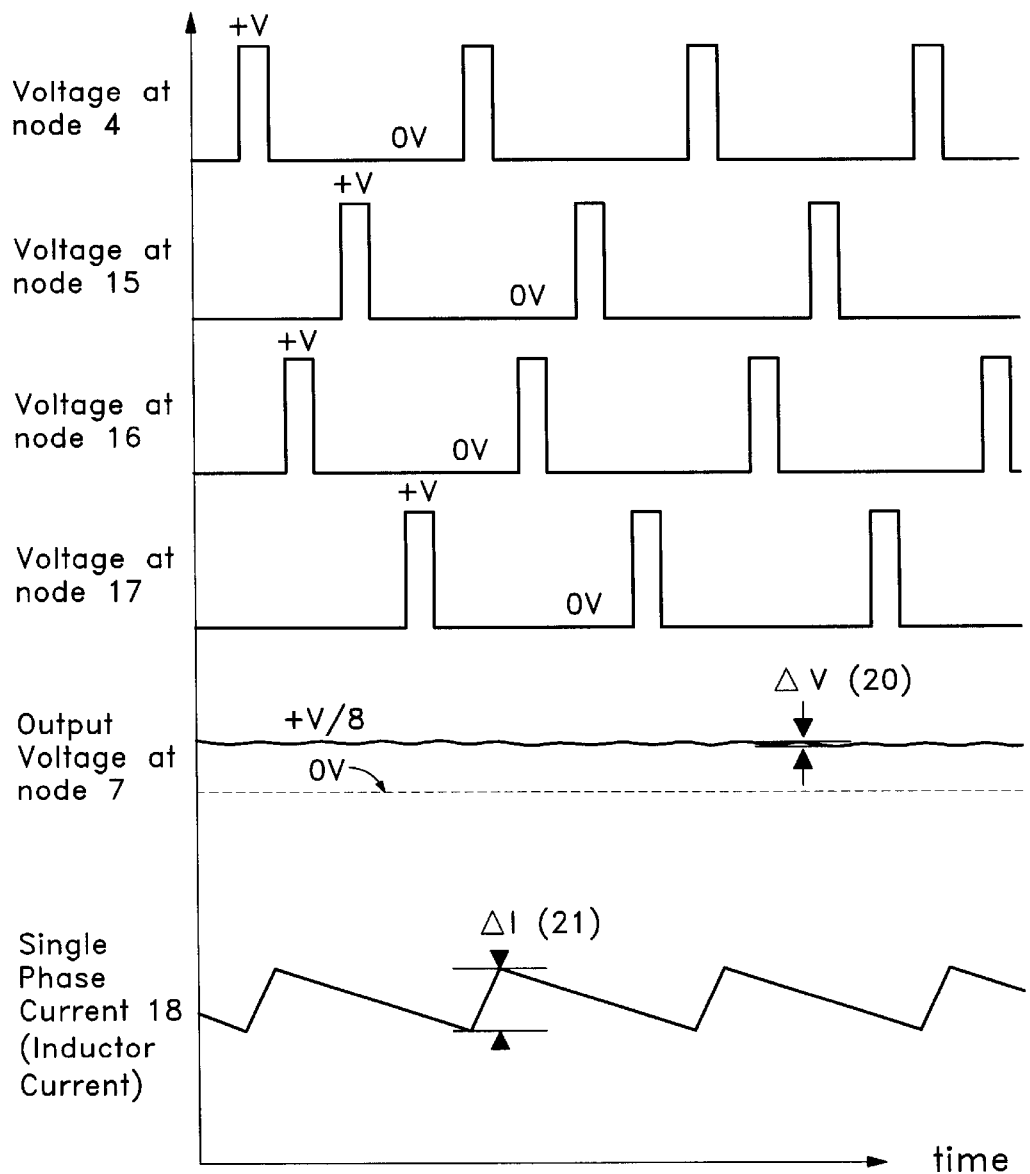
Figure 3 — Waveforms for the conventional four phase converter

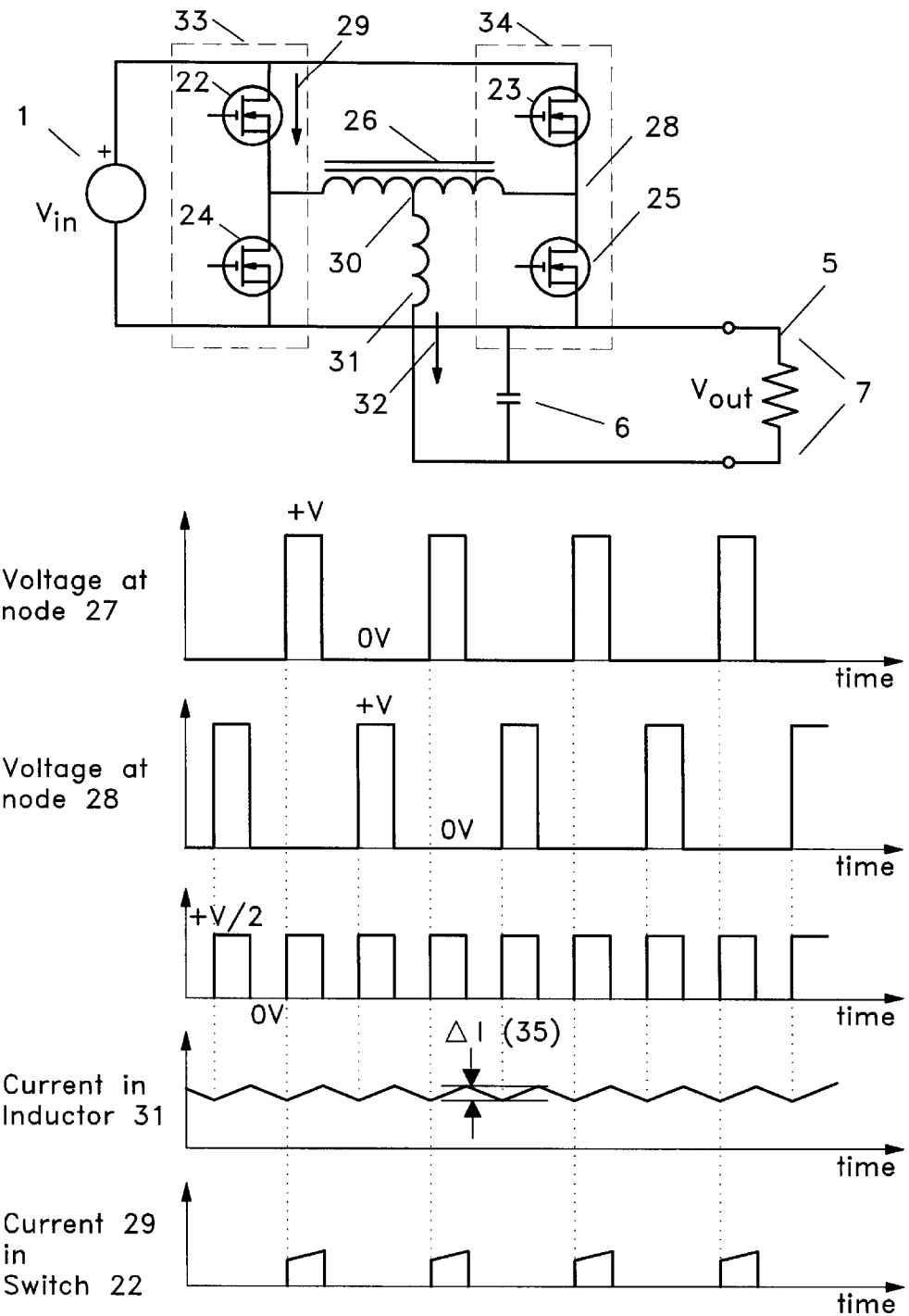
Figure 4 — Power Converter with L-C Filter and Waveforms

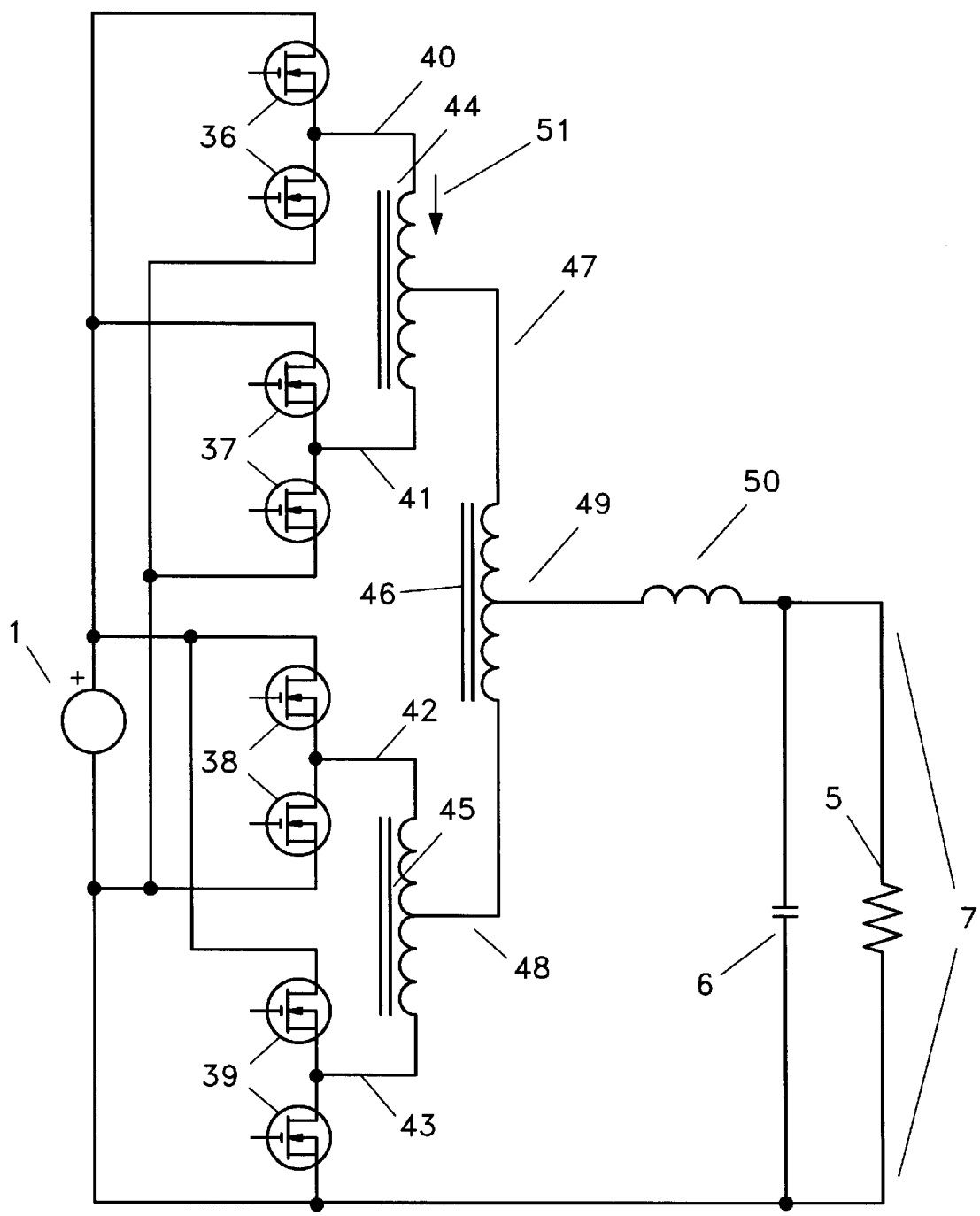
Figure 5 – Four Phase Power Converter

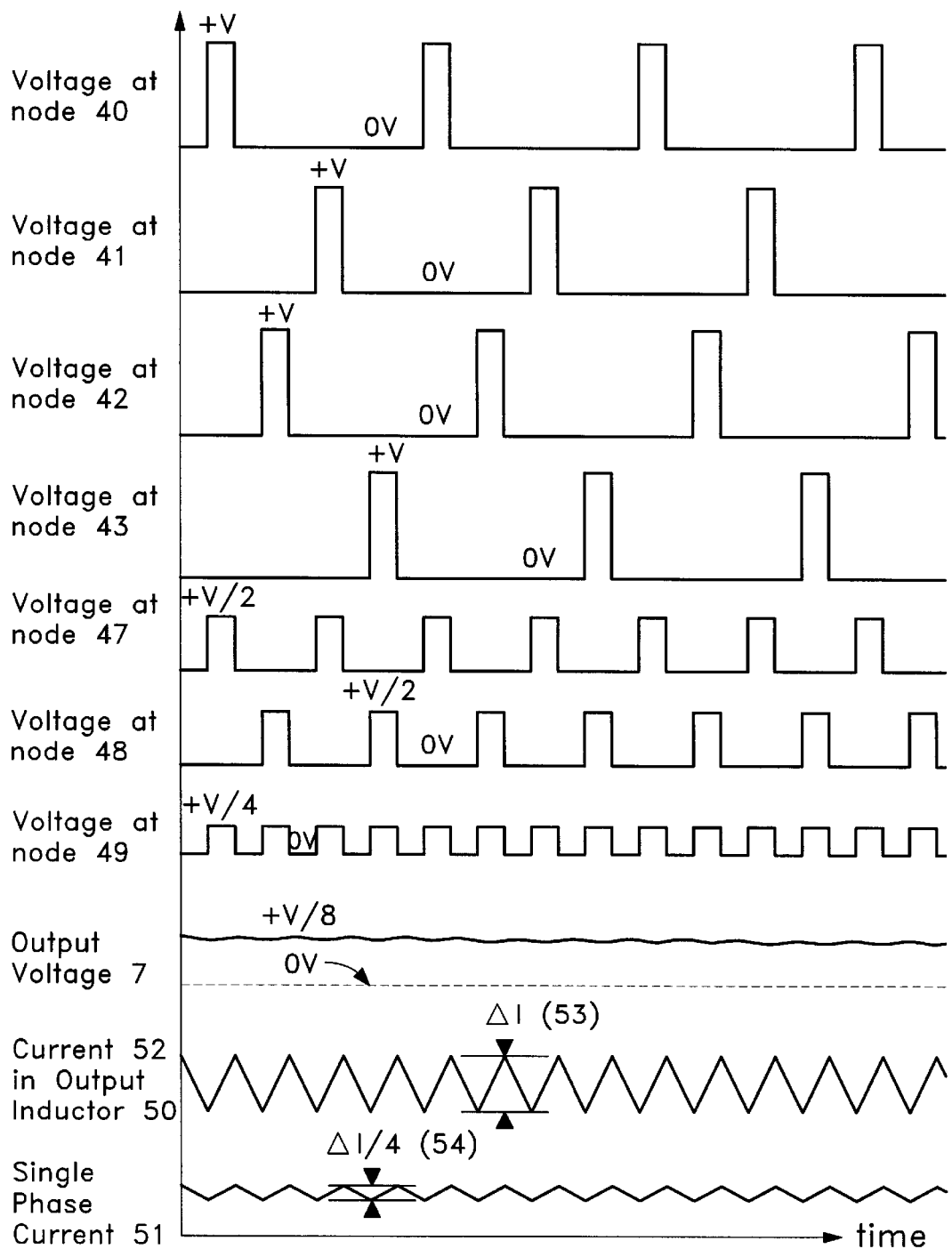
Figure 6 — Waveforms for the four phase converter

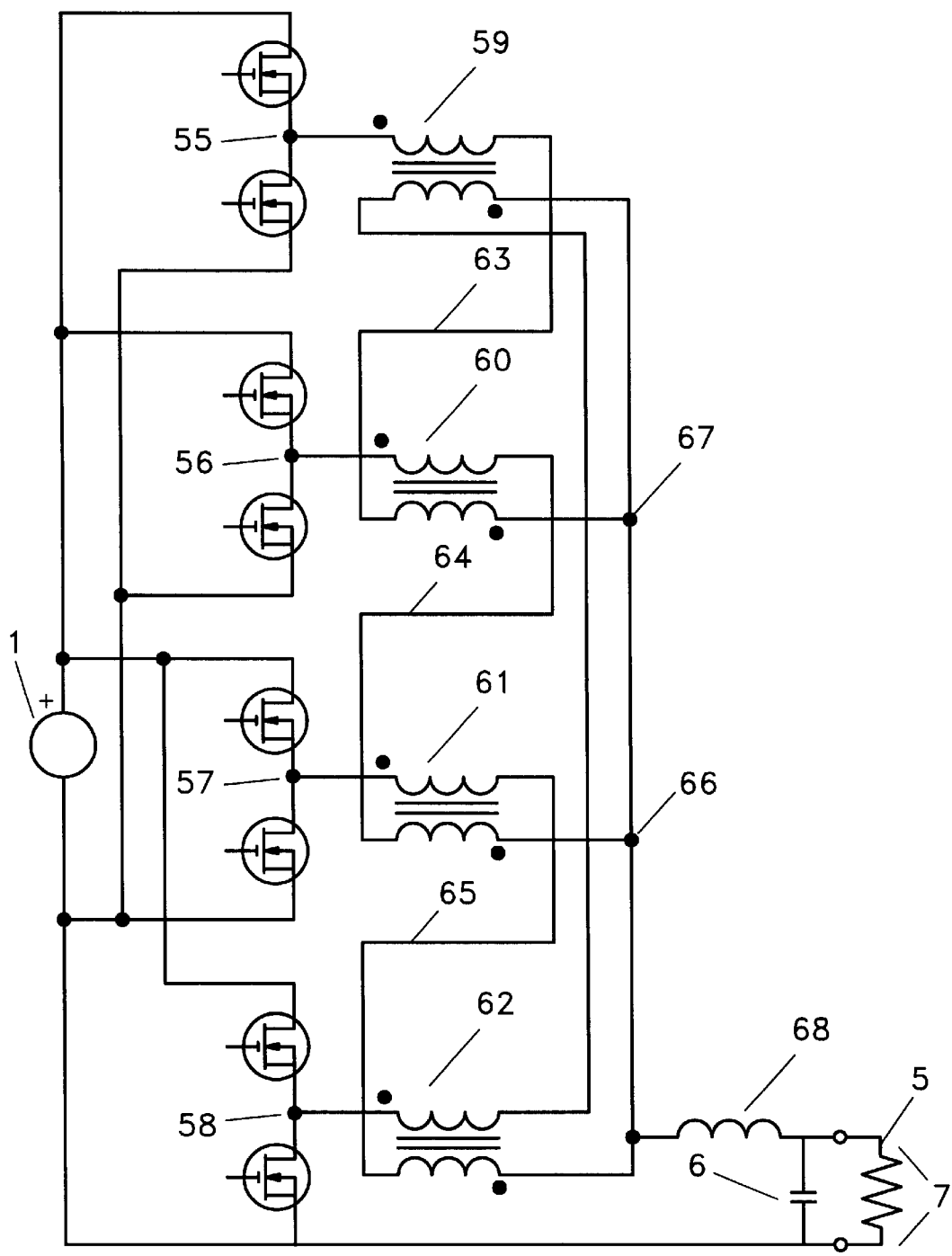
Figure 7 — Four Phase Converter — Parallel Output
Configuration — Four Combiner Transformers

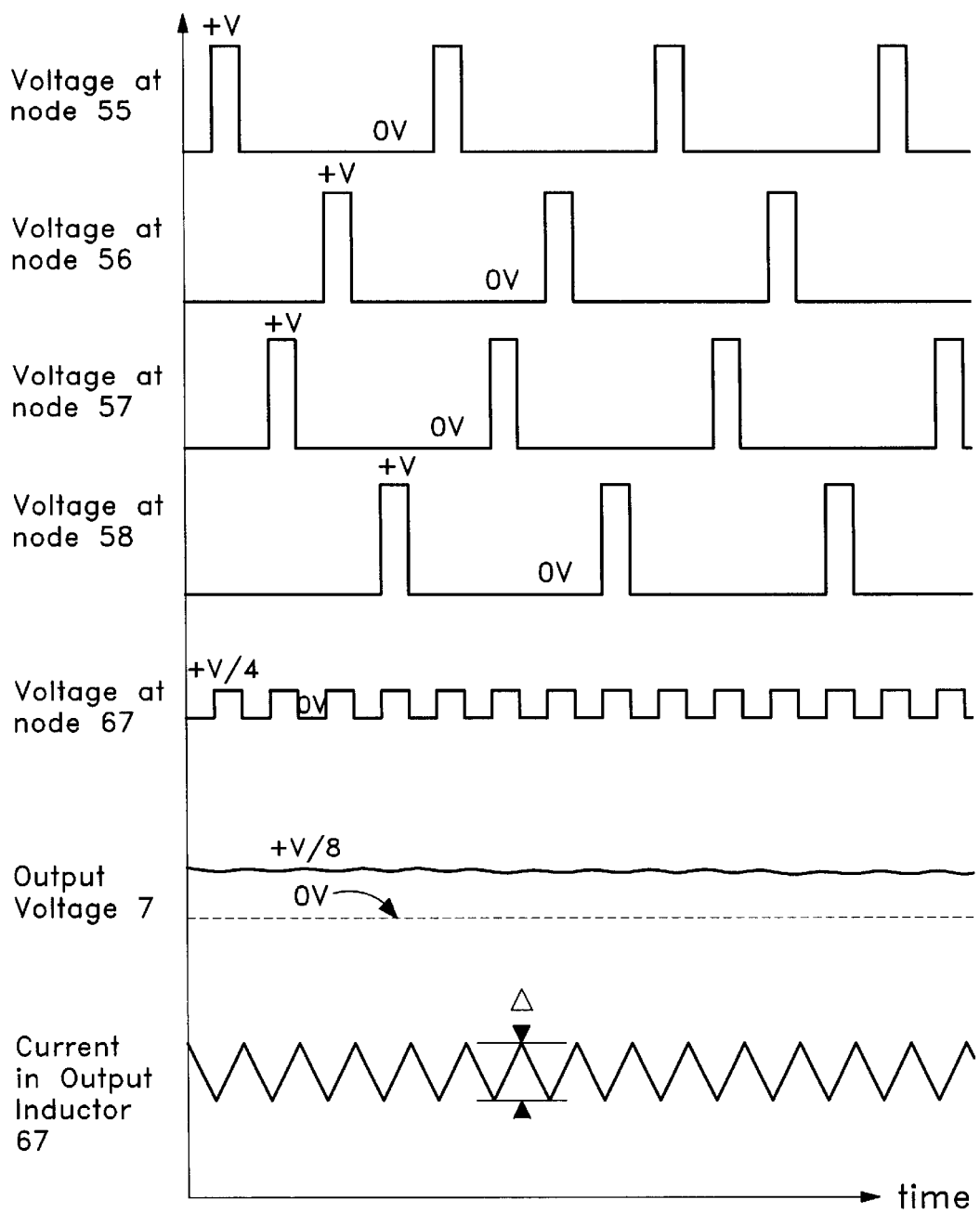
Figure 8 — Waveforms for the four phase converter of Figure 7

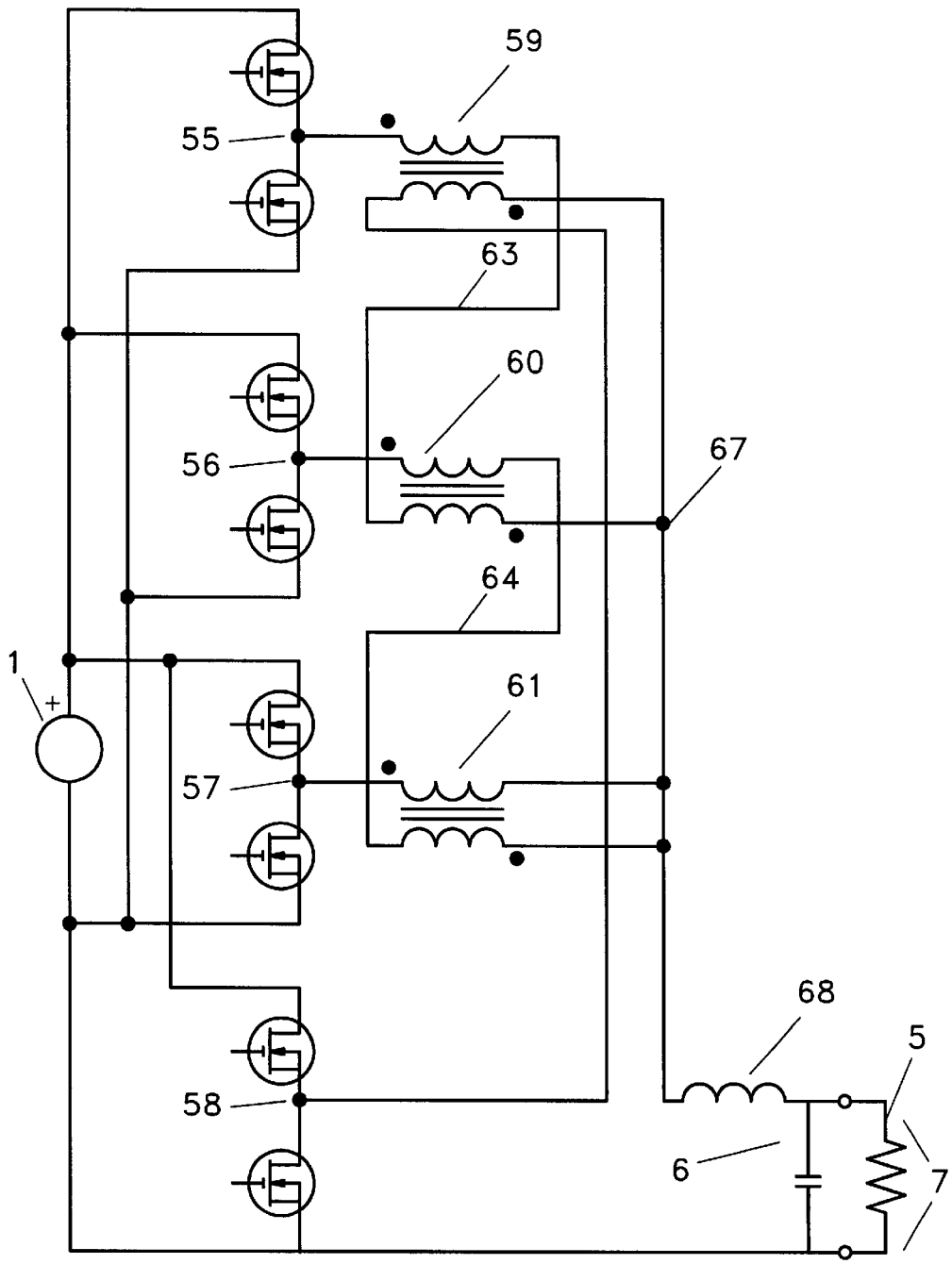
Figure 9 – Four Phase Converter – Parallel Output Configuration – Three Combiner Transformers

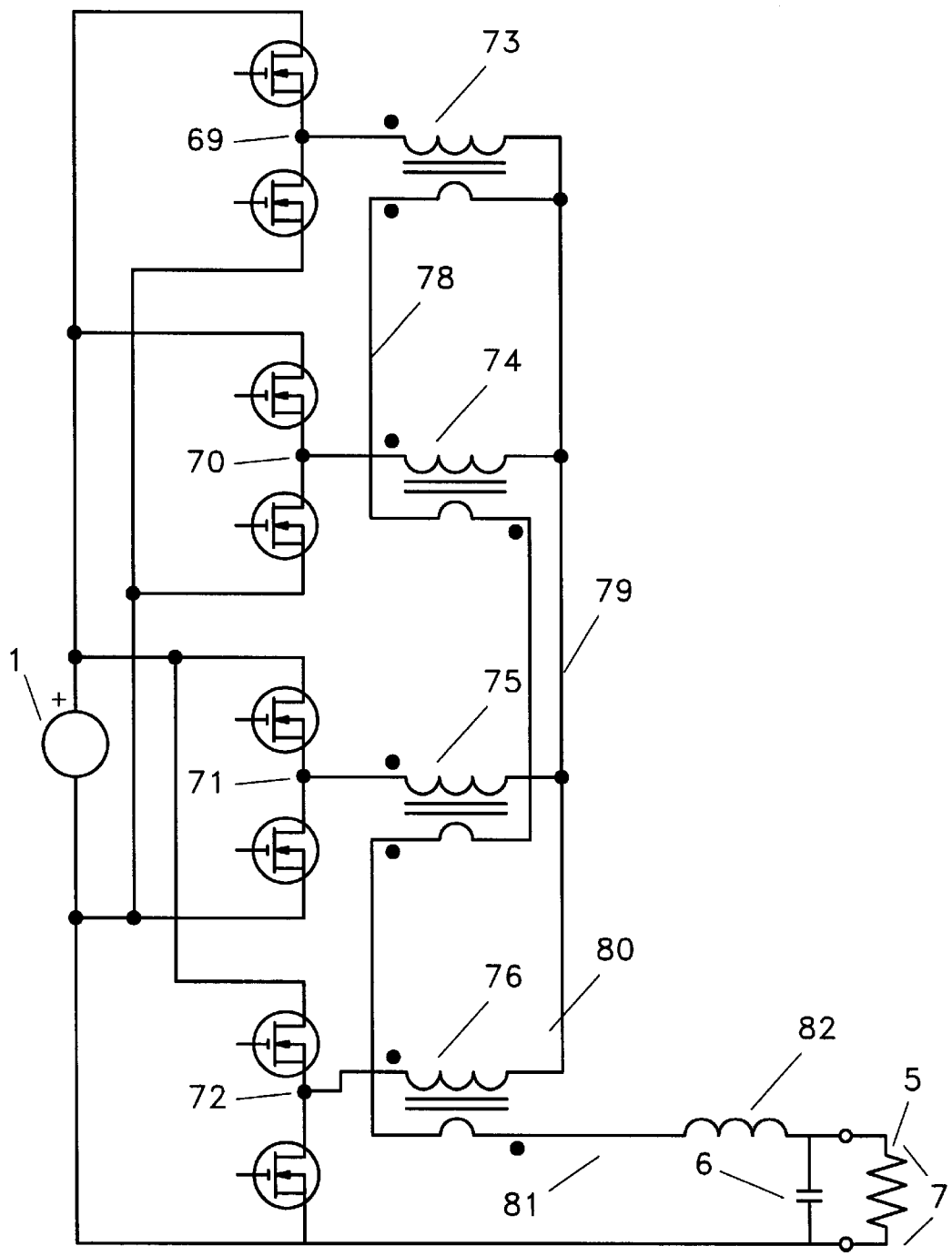
Figure 10 — Coupled Inductor Four Phase
Converter — Series Output Configuration

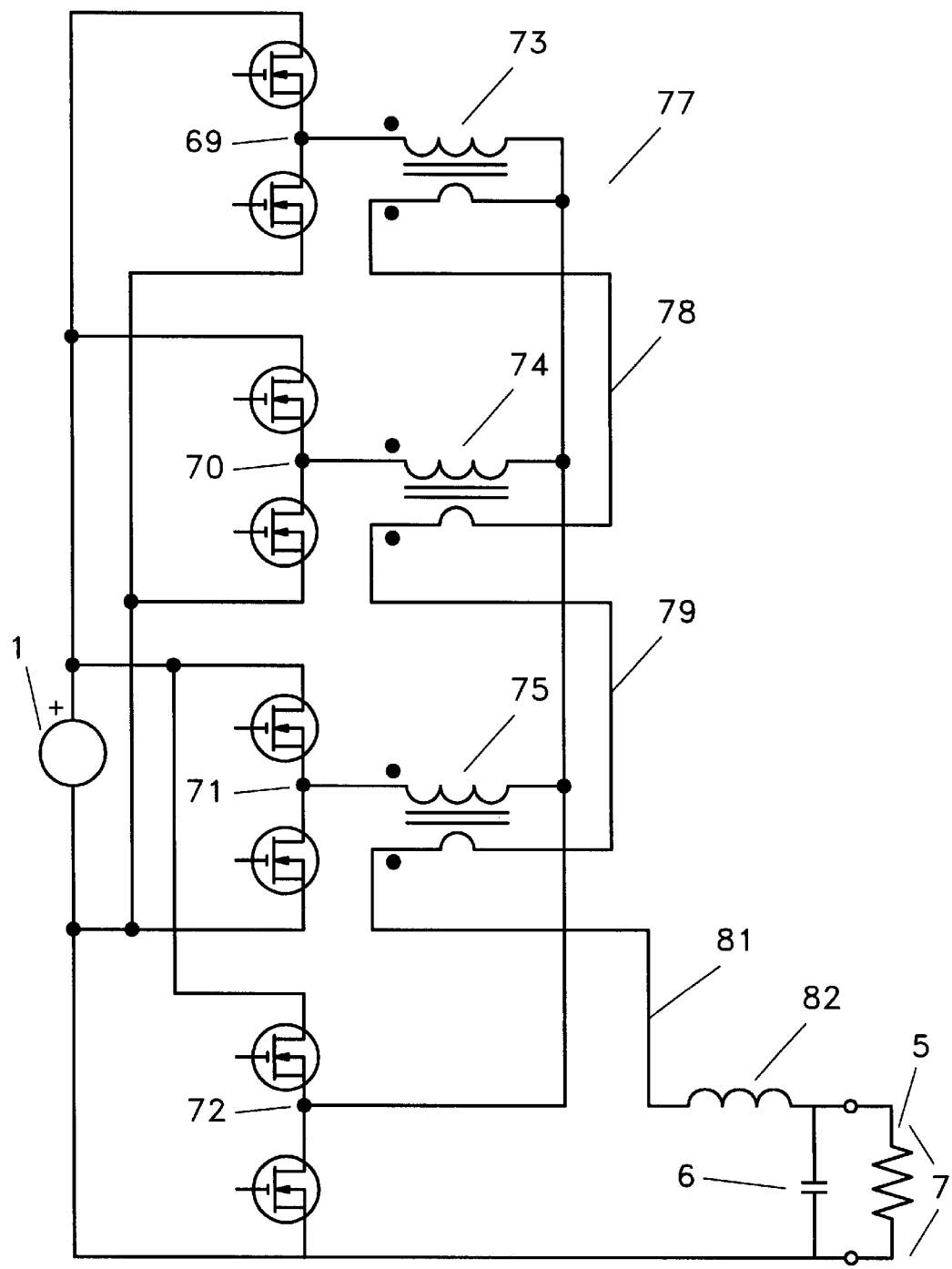
Figure 11 — Four Phase Converter — Series Output Configuration — Three Combiner Transformers

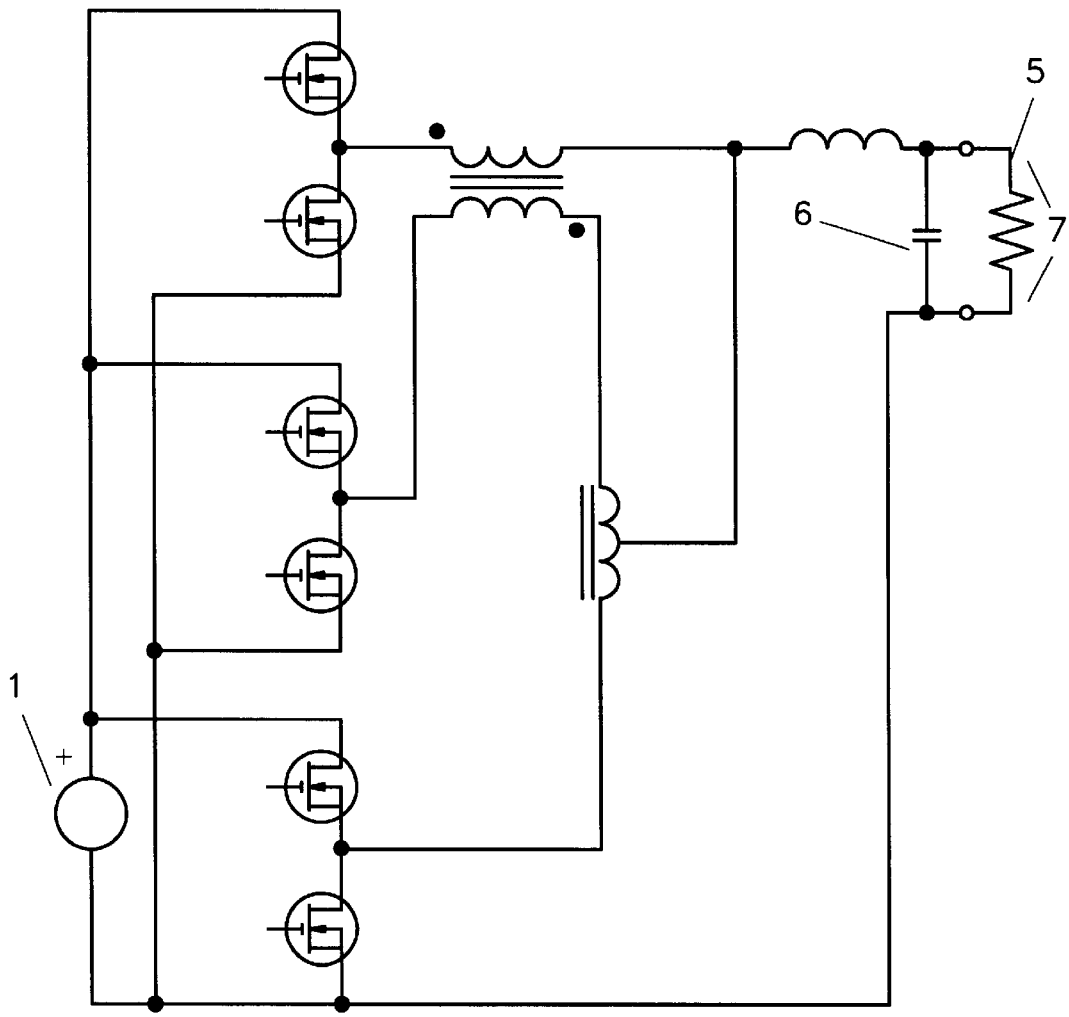
Figure 12 — Three Phase Converter — Mixed Combiner Circuit — 1:1 Transformers

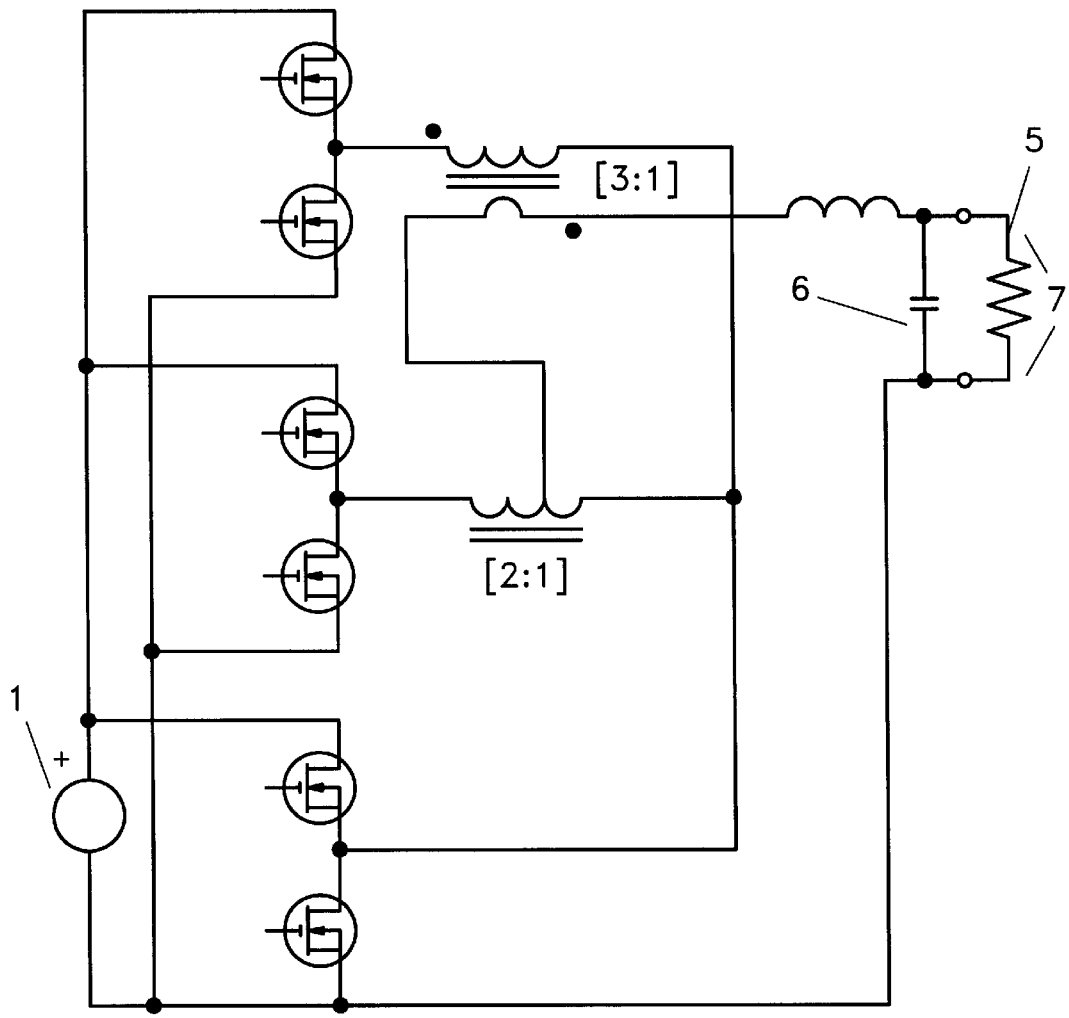
Figure 13 — Three Phase Converter — Mixed
Combiner Circuit — 1:3 Transformers

MULTIPLE POWER CONVERTER SYSTEM USING COMBINING TRANSFORMERS

CROSS-REFERENCE TO RELATED APPLICATION

This application is a continuation-in-part application of U.S. patent application Ser. No. 09/584,412 filed May 31, 2000 entitled "System For Controlling The Delivery Of Power To DC Computer Components which claims the benefit of Provisional Applications Number 60/142,102 filed on Jul. 2, 1999 and Application Ser. No. 60/144,342, filed on Jul. 16, 1999, the contents of each being hereby incorporated by reference.

BACKGROUND OF THE INVENTION

The present invention generally relates to the area of powering low voltage, high current electronics. In particular, the invention may be applicable in the field of computing, and much of the following description is presented in that context. It should be understood, however, that the invention is in no way limited to the field of computing, and may be applicable to a wide variety of circumstances wherein a variety of power absorbing loads may abruptly change their power absorbing characteristics (that is to say, their impedance may undergo a rapid change). The invention may also be applicable if such loads are separated physically such that the voltage which may be dropped across the dynamic impedance of the power carrying conductors is a significant fraction of the voltage delivered to such loads. It may also be increasingly applicable to applications wherein design tradeoffs are forcing a steady decrease in operating voltages. Such situations may arise in telecommunications, radar systems, vehicle power systems and the like, as well as in computing systems.

The architecture of computing systems has undergone tremendous changes in the recent past, due principally to the advance of microcomputers from the original four-bit chips running at hundreds of kilohertz to the most modem 32 and 64 bit microprocessors running at hundreds of megahertz. As the chip designers push to higher and higher speeds, problems may arise which relate to thermal issues. That is, as the speed of a circuit is increased, the internal logic switches each may discharge its surrounding capacitance that much faster. Since the energy stored in that capacitance may be considered fixed (at a given voltage), as the speed is increased, that energy, which may be dissipated in the switches, may be dumped into the switch that many more times per second. Since energy per second may be defined as power, the power lost in the switches therefore increases directly with frequency.

On the other hand, the energy stored in a capacitance may increase as the square of the voltage, so a capacitor charged to two volts may store only 44% of the energy that may be stored in that same capacitor charged to three volts. For this reason, a microcomputer designed to operate at two volts will, when run at the same speed, dissipate much less power than the same microprocessor operating at three volts. There may be a tendency, therefore, to lower the operating voltage of microprocessors.

Other considerations may cause the microprocessor to exhibit a lower maximum speed if operated at a lower voltage as compared to a higher operating voltage. That is, if a circuit is operating at full speed, and the voltage on that circuit is simply reduced, the circuit may not operate properly, and the speed of the circuit (the "clock speed") may have to be reduced. To maintain full speed capability and still operate at lower voltage, the circuit may have to be redesigned to a smaller physical size. For the past few years, these steps may have been considered the general course of microprocessor design. Microprocessor designers, seeking the maximum speed for their products, may expend considerable effort evaluating any number of considerations, including:

higher speed chips and potential chip value;

higher speed chips and potential heat dissipation;

potential limitations to the removal of heat;

lower voltages and the potential reduction of heat generated at a given speed; and smaller devices and potential speed at a given voltage.

There may be many more important trade-off considerations for the designers in evaluating microprocessor design.

The evaluation of microprocessor considerations may have lead to the production of designs that operate at lower and lower voltages. Early designs may have operated at higher voltages, such as five volts, which have been subsequently reduced to current designs operating at lower voltages, such as 2.0 volts. Further reductions may occur, and future designs might be operated at 1.8, 1.5, 1.3, 1.0, and even below one volt, perhaps as low as 0.4 volts.

Meanwhile, advances in heat removal may permit processors to run at higher and higher heat dissipation levels. Early chips may have dissipated perhaps a watt; current designs may operate at the 50 watt level, and heat removal designs in the near future may be able to dissipate as much as 150 watts of power generated by the processor. Since the power dissipated may be considered proportional to the square of the operating voltage, even as the ability to remove heat is improved, lower operating voltages may still be desirable.

All of this might be viewed in the context of higher speed chips having a higher monetary value. Therefore, designers may be driven to increase the speed, potentially driving the size of the chips smaller, the voltages lower, and the power up. As may be generally known, as the voltage drops the current increases for a given power, power being defined as voltage times current. If at the same time improvements in heat removal permit higher powers, the current may increase still further. This may mean that the current rises very rapidly. Early chips may have drawn small fractions of an ampere of supply current to operate, whereas current designs may use up to 50 amperes, and future designs may use as much as 150 amperes or more.

As the speed of the processors increase, the dynamics of their power supply requirements may also increase. A processor may be drawing very little current because it is idling, and then an event may occur (such as the arrival of a piece of key data from a memory element or a signal from an outside event) which may cause the processor to suddenly start rapid computation. This may produce an abrupt change in the current drawn by the processor, which may potentially have serious electrical consequences.

As may be generally known, inductance is the measure of energy storage in magnetic fields. Current-carrying conductors have associated with the current a magnetic field, which represents energy storage. As it may be generally known, the energy stored in a magnetic field is half the volume integral of the square of the magnetic field. Since the field may be considered linearly related to the current in the conductor, it may be shown that the energy stored by a current-carrying conductor is proportional to half the square of the current, and the constant of proportionality may be called the "inductance" of the conductor. The energy stored in the system may be supplied by the source of electrical current, and for a given power source there may be a limit to the rate at which energy can be supplied, which means that the stored energy must be built up over time. Therefore, the presence of an energy storage mechanism may slow down a circuit, as the energy may be produced and metered into the magnetic field at some rate before the current can build up.

The available voltage, the inductance, and the rate of change of current in a conductor may be related by the following equation, well known to those skilled in the art:

$$V = L * \partial I / \partial t,$$

where L is the inductance of the conductor, and $\partial I/\partial t$ is the rate of change of current in the conductor.

This equation may be read to provide that the voltage required to produce a given current in a load on a power system increases as the time scale is reduced, and also increases as the inductance of any connection to that load is increased. In a corresponding fashion, as the speed of microprocessors may be increased, the time scale may be reduced, and as the voltage may be reduced, the equation may be read to require the inductance to be dropped proportionally.

Often, in powering semiconductor devices, a designer may not need to consider the inductance of the connections to the device, but with modern high speed circuits these considerations may force the attention to be brought to lowering the inductance of the connections. Microprocessors may currently operate at about two volts, and may tolerate a voltage transient on their supply lines of about 7%, or 140 millivolts. These same microprocessors may require that their supply current change at a rate of nearly one ampere per nanosecond, or $10^9$ amperes/second. The above equation may be read to indicate that an inductance of 140 picohenries ($1.4*10^{-10}$H) may drop a voltage of 140 millivolts. To put this number in perspective, the inductance of a wire one inch in length in free space may be approximately 20,000 picohenries. While the inductance of a connection may be reduced by paralleling redundant connections, to create a connection with an inductance of 140 picohenries with conductors about a centimeter long might require nearly 100 parallel conductors.

The foregoing discussion might provide the source of low voltage physically close to the microprocessor, which in turn might provide the source of low voltage to be physically small. While it may be suggested that capacitors might be used to supply energy during the delay interval required for the current in the conductors to rise, the inductance of the connections to the capacitors may be considered limiting to this approach. The designer may be faced with placing the source of power very close to the processor to provide adequate stability to the processor's power source under rapid changes in current draw. This requirement may become increasingly prevalent as the voltages drop and the currents increase, because the former may reduce the allowable transient size and the latter may increase the potential rate of change of current. Both factors may reduce the permissible inductance of the connection.

The foregoing remarks may not be limited in computers to the actual central microprocessor. Other elements of a modern computer, such as memory management circuits, graphic display devices, high speed input output circuitry and other such ancillary circuitry may have been increased in speed nearly as rapidly as the central processing element, wherein the same considerations would apply.

All modern electronics circuitry, including computers, may be powered by switch-mode power conversion systems. Such a system may generally be considered to convert incoming power from the utility line to the voltages and currents required by the electronic circuitry. In low power business and consumer electronics, such as desktop personal computers, the incoming power is generally supplied as an alternating voltage, generally 115 volts in the United States, and 220 volts in much of the rest of the world. The frequency of alternation may be either 50 or 60 Hertz, depending upon location. Such utility power is generally converted to low voltage steady (direct) current, or dc, and may be regulated to a few percent in order to be useful as power for the electronic circuits. A device which may perform such conversion is generally called a "power supply". While it may possible to create a low voltage regulated dc power source using simple transformers, rectifiers, and linear regulators, such units may generally be heavy, bulky and inefficient. In these applications it may be desirable to reduce weight and size, and these approaches may be unsuitable for this reason alone. In addition, the inefficiency of linear regulators may also be unacceptable. Efficiency may be defined as the ratio of output power to input power, and a low efficiency might imply that heat is being developed in the unit which could be transferred to the environment to keep the unit cool. Generally, the lower the efficiency the more heat to be transferred, therefore a possible reason for finding an alternate approach.

For these reasons, virtually all modern electronics circuitry is powered by switchmode conversion systems. These systems typically operate as follows. The incoming utility power is first converted to unregulated direct current by a rectifier. The rectified dc is then converted to a higher frequency, typically hundreds of kilohertz, by electronic switches. This higher frequency power is then transformed by a suitable transformer to the appropriate voltage level; this transformer also provides isolation from the utility power, required for safety reasons. The resulting isolated higher frequency power is then rectified again, and filtered into steady direct current for use by the electronics. Regulation of the output voltage is usually accomplished by control of the conduction period of the electronic switches. The resulting power conversion unit is smaller and lighter in weight than earlier approaches because the size and weight of the transformer and output filter are reduced proportionally to the increase in frequency over the basic utility power frequency. All of this is well known in the prior art.

In a complex electronic system, various voltages may be required. For example, in a computer system the peripherals (such as disk drives) may require +12 volts, some logic circuits may require +5 volts, input/output circuits may additionally require −5 volts, memory interface and general logic may require 3.3 volts, and the central microprocessor may require 2.0 volts. The central power source (the device that is connected directly to the utility power) standards may require delivery of delivers +12, 3.3 and ±5 volts, and any required lower voltages may be derived from a +5 or +12 volt supply line by additional circuitry, generally known as voltage regulation modules, or VRMs, generally placed near to the circuits that require the lower voltage. These additional circuits may again convert the higher voltage supply to high frequency ac power, modifying the voltage through control of the period of the ac power, and again re-rectifying to the lower voltage dc. The VRM may take many forms, but a commonly used circuit approach may be the so-called "buck converter", which may "chop" the input voltage to a square wave with an average voltage equal to the required output voltage, and then may filter the square waveform to remove the alternating component, leaving the desired low voltage dc.

There may be several problems with this standard approach, but one of particular relevance here may relate to the speed of response of the regulation system. A rapid change in the load impedance may cause a disturbance in the output voltage unless corrected, possibly by some control loop. This disturbance may be caused by the response of the filtering system used to remove the alternating component from the square wave output. The speed with which the control loop can respond may depend upon the characteristics of that filtering system and also upon the frequency of operation of the converter (the "switching frequency").

One may increase this speed of response by storing less energy in the filtering system. Such a filtering system may comprise a simple series connection of an inductor and a capacitor. Storing less energy may require reducing the value of the inductance and capacitance, but may be limited in the ability to reduce these values by potential necessity to adequately remove the ac component (called "ripple") generally at the output of the filter. The ripple may be reduced for a given value of inductance and capacitance by increasing the switching frequency, but this again may be limited by the ability of the electronic switches used in creating the square waveform from the dc input. Such switches may have a limited operating frequency, and may exhibit losses (known as "switching losses") which may increase with the operating frequency.

What is needed, then, is a VRM power conversion approach which may operate at a relatively low frequency to permit efficient operation of the electronic switches, which may have a low output ripple, which may store less energy in the output filter for a given frequency, and which may be at least as low in cost as prior art technology. Accordingly, substantial attempts such as those previously described by those skilled in the art may not have fully addressed the considerations raised. The present invention may be considered to address many of the previously mention considerations and may be considered in some aspects a development away from that which was previously known in the art.

SUMMARY OF THE INVENTION

Accordingly, it is an object of the present invention to provide a means of converting medium voltage dc power to a low voltage dc power at high current, permitting operation at higher efficiency than can be achieved using prior art techniques.

It is another object of the present invention to maintain that efficiency over a wide range of load conditions.

It is yet another object of the invention to provide a source of low voltage dc power at high currents which can sustain its voltage across a varying load even in the presence of high rates of change of current draw.

It is also an object of the preset invention to provide closer control of the output voltage of the power converter, even for extremely short time periods. That is to say, it is an object to provide a power source with better transient response to changes in load.

It is a further object of the invention to provide a power conversion system which stores less energy than that required by the prior art.

It is additionally an object of the present invention to provide a power conversion system which can be produced at lower cost than alternative approaches with similar characteristics.

Accordingly, the present invention is directed to a system of power conversion for performing a conversion from medium voltage dc to low voltage, high current dc at the point of power consumption with high efficiency and fast response.

The present invention utilizes a plurality of simple power converters, combined with coupled inductors, so arranged that the group of converters act together to produce a combined output which exhibits low voltage, high current, and fast regulation response.

BRIEF DESCRIPTION OF THE DRAWINGS

FIG. 1 depicts one embodiment of a buck converter in accordance with principles known in the prior art, together with its waveforms.

FIG. 2 depicts a particular embodiment of a four phase buck converter in accordance with principles known in the prior art.

FIG. 3 depicts the waveforms for the four phase buck converter circuit embodiment of FIG. 2.

FIG. 4 depicts one embodiment of a power converter using two buck converters combined with a combining transformer in accordance with the present invention together with its waveforms.

FIG. 5 depicts a four phase power converter embodiment in accordance with the present invention.

FIG. 6 depicts waveforms for the power converter circuit embodiment of FIG. 5.

FIG. 7 is an embodiment of the invention depicting a four phase converter using four transformers in a parallel output configuration in accordance with the present invention.

FIG. 8 depicts the waveforms for the parallel output four phase converter embodiment shown in FIG. 7.

FIG. 9 is an embodiment of the invention depicting a four phase converter in a parallel output configuration using three transformers in accordance with the present invention.

FIG. 10 is an embodiment of the invention depicting a four phase converter using four transformers in a series output configuration in accordance with the present invention.

FIG. 11 is an embodiment of the invention depicting a four phase converter in a series output configuration in accordance with the present invention which utilizes three transformers.

FIG. 12 is an embodiment of the invention depicting a three phase converter in a mixed combiner circuit in accordance with the present invention which utilizes 1:1 transformers.

FIG. 13 is an embodiment of the invention depicting a three phase converter in a mixed combiner circuit in accordance with the present invention which utilizes 1:3 transformers.

DETAILED DESCRIPTION OF PREFERRED EMBODIMENTS

As can be easily understood, the basic concepts of the present invention may be embodied in a variety of ways. These concepts involve both processes or methods as well as devices to accomplish such. In addition, while some specific circuitry is disclosed, it should be understood that these not only accomplish certain methods but also can be varied in a number of ways. As can be seen from the drawings, the basic concepts of the present invention may be embodied in many different ways. Importantly, as to all of the foregoing, all of these facets should be understood to be encompassed by this disclosure.

In the production of a low regulated dc voltage from a higher voltage source, the so-called "buck" converter may be commonly used. This converter, illustrated in FIG. 1, may be considered a simple circuit with generally four basic components: two electronic switches, one inductor, and one capacitor. If the output voltage is large compared with the voltage drop across a diode, the lower electronic switch may be replaced by a diode.

The circuit in FIG. 1 works as follows. Switches 2 may be periodically and alternately actuated so that part of the period the voltage at node 3 may be equal to zero and part of the period the voltage may be equal to supply voltage 1. Thus the voltage at node 3 may be a pulsed waveform, as shown in the lower portion of FIG. 1, with an average value generally less than input voltage 1. During the time the upper switch is on, the current may increase in inductor 4 and during the time the lower switch is on the current in inductor 4 may decrease. The output voltage 7 across load resistance 5 may be equal to the average value of the pulsed waveform at node 3 (and, therefore, may be less than input voltage 1) and may be dc with a superimposed ripple as shown in the lower part of FIG. 1. Regulation or adjustment of the output 7 is obtained by varying the percentage of the time the upper switch is closed relative to the lower switch.

As mentioned above, the direction of microprocessor and specialized semiconductor integrated circuits may be such that the powering voltages and transient response time may be decreasing rapidly while the current is increasing. A principal problem with transient response may center around inductor 4. To achieve a fast transient response, inductance 4 may be made as small as possible. Neglecting issues such as regulation loop response and delay, the buck converter may have a maximum capability to increase its output current which is equal to the input voltage 1 minus the output voltage 7, divided by the value of inductor 4. The converter's ability to decrease the output current may be the output voltage 7 divided by the value of inductor 4, generally different and a smaller number. It may be desirable, therefore, to decrease the value of inductor 4 to the minimum possible level.

The ability of the designer to decrease the value of inductor 4 may be limited by two principal factors: the ripple voltage 9 on the output of the converter and the ripple current 8 in the inductor 4. An important factor in the design of inductor 4 may be the ratio of ripple current 8 to the average value of output current flowing in load resistance 5, as it affects the core material and its size and cost. Further, a large ripple current 8 may increase the losses in switches 2, which may require that they be sized larger and cost more. Perhaps even more important, the presence of large ripple currents may cause voltage drops across parasitic inductances in the wiring and packaging of the various components, and layout may become increasingly difficult or impossible. In practice, the value of inductor 4 may be reduced until the efficiency of the converter is as low as is permissible, and the value of capacitor 6 may be made as large as possible to lower output ripple 9 to acceptable values and to reduce the voltage over- or under-shoot during transient conditions. It should be mentioned that again there may be limits on the designer to increasing the value of capacitor 6, related to the technology of capacitors, and an increase in value may correlate to an increase in cost.

Of course, the design of a power supply for a complex electronic system such as a computer workstation may involve many more factors and tradeoffs than indicated in this discussion.

In an attempt to improve the transient response and lower the output ripple, designers have constructed systems of N buck converters wired in parallel, as shown in FIG. 2 for the case of four converters. Switch pairs 10, 11, 12, 13 may be driven simultaneously, or in a phase sequence by delaying each pair's switching action by a fraction of a switching period. FIG. 3 shows possible waveforms for the latter case. Generally this "multiphase" approach may be used because the magnitude of the output ripple 20 may thereby be reduced for the same value of capacitor 6 when compared to paralleled buck converters driven simultaneously. This multiphase drive may also lower the input ripple (the ac current drawn from power supply 1), which may be an advantage; the drive circuits, not shown in FIG. 2, may become more complex, but may not be too expensive as these may be considered low level circuits which can be incorporated into a single integrated circuit.

As has been already mentioned, the transient response of a buck converter may be determined by the input voltage 1, the output voltage 7 and the value of series inductor 19 in FIG. 2. If the N converters are driven simultaneously (i.e., not in multiphase), each of the inductors 19 may be made larger by a factor of the number of converters in the system (four in FIG. 2), as the total response of the output may be the sum of the individual converters. In this case the ripple current 21 may be N times smaller and the dc current N times smaller, leaving the ratio unchanged from the single converter case. The individual converter's ability to produce a change in the output 7 may be smaller by a factor of N, but the system of converters may be able to change the output at the same rate as the single converter case. Since each converter may handle 1/N of the current and have 1/N of the current ripple, each converter may be made smaller by a factor of N. The output ripple frequency, however, is the fundamental frequency and there may be no improvement over the single converter case—that is, the value of capacitor 6 may not be reduced. The apparent gain in dividing the single buck converter into a system of smaller ones is the easing of the handling of parasitic reactance of the wiring and packaging of the various components, at the expense of increasing the number of components by N.

If, on the other hand, the converter system is driven in a multiphase manner, as shown in the waveforms of FIG. 3, each buck converter may be governed by its own ability to modify the output current in its turn. At the moment of switching each converter can change the output by a factor 1/N (¼ in this case), but within a total period all N converters will be actuated and therefore again the system of converters may be able to change the output at the same rate as the single converter case of FIG. 1.

The ripple current 21 in inductors 19 may be determined by the difference between the input voltage 1 and output voltage 7 divided by the inductance, and may be the same as the simultaneous drive case just mentioned: the ripple current being N times smaller and the dc current in the inductor 19 also N times smaller, and the ratio of ripple current 21 to output current 18 for each converter unchanged from the single converter case of FIG. 1. There may be a reduction in output ripple by a factor of N, because the size of the current impulses absorbed by capacitor 6 may be reduced by a factor of N (4 in this case) and the frequency of these impulses increased by the same factor. This may permit a reduction in the size of capacitor 6 in some cases. Also, there may be a reduction in the pulsed current drawn by the system of converters from input source 1 for the same reason. These reductions in peak input and output ripple current may permit some ease in layout of the circuit and some tolerance to the reactance of the wiring and the packaged electronic components comprising the system.

Nevertheless, assuming that the designer has optimized the value of inductors 19 in the same way for the multiphase system of FIG. 2 as in the single buck converter—that is, to choose a reasonable maximum value for the ratio of the ripple current 21 to the dc current 18 and for the root-mean-square current losses in switch pairs 10, 11, 12 and 13, there may be no improvement in transient response.

Thus, whether the multiple buck conversion systems of the prior art are driven simultaneously or in multiphase, there may be no improvement in transient response, and the advantages of such systems may be marginal and related to some ease of layout in return for significantly higher cost.

The present invention in particular embodiments uses combining transformers to overcome the limitations of the prior art converter systems. To understand how particular embodiments of the invention are accomplished, it may be best to start with an embodiment of but two converters as shown in FIG. 4. In FIG. 4 it may be seen that switches 22 and 24 comprise a first switching stage 33 and switches 23 and 25 comprise a second switching stage 34. These two stages are driven in "multiphase", as will be seen in the waveforms of FIG. 4. The outputs of these two stages may be combined in combining transformer 26 before being presented to an output filter comprised of inductor 31 and capacitor 6.

The waveforms in FIG. 4 are shown for an output voltage 7 equal to one-fourth of the input voltage 1. In this case, switches 22 and 24 and switches 23 and 25 each may produce a waveform with a 25% duty factor; that is, the period of conduction of switches 22 and 23 may be one-third of the periods of conduction of switches 24 and 25. Thus the average value of the voltage at nodes 27 and 28 may be one-fourth of the input voltage. Since there can be no steady state dc voltage across the windings of transformer 26, the average dc voltage at node 30 may also be one-fourth of the input voltage. The alternating component of the voltage at node 30 may be half the algebraic sum of the voltages at nodes 27 and 28:

$$V_{30} = \tfrac{1}{2}(V_{27} + V_{28})$$

and, as shown in FIG. 4, may therefore be a square wave of twice the switching frequency of the individual switching stages and half the amplitude. The ripple current 35 in filter inductor 31 may be reduced therefore by a factor of, $$\eta = \frac{\tfrac{1}{2}V_{in} - V_{out}}{V_{in} - V_{out}} = \frac{1}{2}\frac{V_{in} - 2V_{out}}{V_{in} - V_{out}}$$

which, for the case of FIG. 4 ($V_{in}=4V_{out}$), reduces to one-third of the magnitude of the ripple current 5 in the buck converter of FIG. 1, for the same value of inductance, input voltage and output voltage. Thus, to maintain the same ratio of ripple current 35 to average output current 32 in inductor 31 of FIG. 4 as compared to inductor 4 in FIG. 1, one could reduce the value of inductor 31 by a factor of three.

Further, the average current 26 in switching transistor 22 during its conduction period may be half of the average output current by the action of transformer 26, and the ac component of current 26 may also be half of the ac component 35 of current 32 in inductor 31. Of course, as there are four switches in FIG. 4 as compared to two switches in FIG. 1, the total losses in the totality of switches in the two figures may be the same if the inductor is reduced by the above factor of three.

This reduction in the value of output inductor 31 may produce an improved transient response by the same factor of three over that of the simple buck converter of FIG. 1 or the multiple buck converter system of FIG. 2.

Note from the foregoing that, if $V_{out}=V_{in}/2$ and the factor h=0, the ripple current is zero. Graphically, this occurs because the square waves at nodes 27 and 28 add together in this case to form a waveform which may be "pure dc"; that is, a waveform without any variations or "gaps". In this case the inductor could, in principle, be reduced to very nearly zero. From this it may be seen that, if one has the freedom to choose the input voltage to be exactly twice the required output voltage, one can obtain very fast transient response in such a circuit. Of course, the designer should allow for variations in both the input and output voltage, but by working close to the point where h=0, the transient response may be greatly improved. As will be seen, systems with N converters have in general (N−1) "magic ratios", where improvement may be possible in transient response by reduction of the value of the filter inductor without increase in output ripple, inductor complexity, or switch losses. Even if the system of the present invention is operated at input/output ratios different from these special points, however, a substantial reduction in the value of the filter inductance and a concomitant increase in transient response.

FIG. 5 shows a four-converter embodiment of the present invention. Here switch pairs 36, 37, 38 and 39 may be driven in a multiphase manner as shown in the waveforms of FIG. 6. Outputs 40, 41, may be combined with combining transformer 44, outputs 42 and 43 may be combined with combining transformer 45, and the resulting signals 47 and 48 may be combined in combining transformer 46 to form a single output which is connected to an output filter comprised of inductor 50 and capacitor 6. Mathematically, this single output is the algebraic mean of the voltages at nodes 40, 41, 42 and 43:

$$V_{49} = \frac{1}{4}\sum_{n=40}^{n=42} (V_n)$$

The waveforms of FIG. 6 are drawn for an output voltage 7 equal to one-eighth of the input voltage 1. In this case, switch pairs 36, 37, 38 and 39 may each produce a waveform with a 12.5% duty factor; that is, the period of conduction of the upper switch of each pair is one-seventh of the period of conduction of the lower switch of each pair. As previously mentioned, the pairs may be driven in multiphase as shown in FIG. 6. Thus the average value of the voltage at each of the nodes 40, 41, 42 and 43 is one-eighth of the input voltage. Since there may be no steady state dc voltage across the windings of transformer 44, the average dc voltage at node 47 is also one-eighth of the input voltage. The alternating component of the voltage at node 47 may be half the algebraic sum of the voltages at nodes 40 and 41, and, as shown in FIG. 6 may be a square wave of twice the switching frequency of the individual switching stages 36 and 37, having half the amplitude of voltages 40 or 41. Similarly, there may be no steady state dc voltage across the windings of transformer 45, and so the average dc voltage at node 48 is also one-eighth of the input voltage, and the alternating component of the voltage at node 48 is half the algebraic sum of the voltages at nodes 42 and 43. Therefore, as shown in FIG. 6, the voltage at node 48 may also be a square wave of twice the switching frequency of the individual switching stages 38 and 39 and having half the amplitude of the voltage at nodes 42 and 43.

The voltage at nodes 47 and 48 may be further combined in combining transformer 46 to form a signal at node 49, which by the same reasoning as above may be a square wave with an average value of one-eighth of the input voltage at a frequency four times that of the individual switching stages 36, 37, 38, and 39, and so having a peak amplitude of one-fourth of the input voltage.

The ripple current 53 in filter inductor 50 may be reduced from that of ripple current 5 for the buck converter of FIG. 1, therefore, by a factor of:

$$\eta = \frac{\frac{1}{4}V_{in} - V_{out}}{V_{in} - V_{out}} = \frac{1}{4}\frac{V_{in} - 4V_{out}}{V_{in} - V_{out}},$$

which, for the case of FIG. 5 ($V_{in}=8V_{out}$) reduces to one-seventh, for the same value of inductance, input voltage and output voltage in the two cases. Thus, to maintain the same ratio of ripple current 53 to average output current 52 in inductor 50 of FIG. 5 as compared to inductor 4 in FIG. 1, one could reduce the value of inductor 50 by a factor of seven.

Further, the average current 51 in switching transistors 36 during their conduction period may be one-fourth of the average output current, by the action of transformers 44, 45 and 46, and the ac component of current 51 may also be one quarter of the ac component 53 of current 52 in inductor 50. Of course, as there are eight switches in the embodiment of FIG. 5 as compared to two switches in the embodiment of FIG. 1, the total losses in the totality of switches in the two figures may be the same if the inductor is reduced by the above factor of seven.

This reduction in the value of output inductor 50 may produce an improved transient response by this same factor of seven over that of the buck converter of FIG. 1 or the multiple buck converter system of FIG. 2.

FIG. 6 shows waveforms for the case of the output voltage equal to one-eighth of the input voltage. If the ratio of input to output voltage is lowered to four, each of the individual switch pairs 36, 37, 38, and 39 may be switching at a 25% duty factor, and the waveforms at nodes 47 and 48 may be at a 50% duty factor. This means that the waveform at node 49 may be a steady dc voltage equal to one-fourth of the input voltage 1, as the waveforms at nodes 47 and 48 may exactly interleave with no gaps. In this case the inductor could, in principle, be reduced to very nearly zero. In analogy to the case of the circuit shown in the embodiment of FIG. 4 operated at a ratio of $V_{in}/V_{out}=2$, if one has the freedom to choose the input voltage to be four times the output voltage, for the circuit in FIG. 5 one can obtain very fast transient response. As before, the designer should allow for variations in both the input and output voltage, but by working close to a point where h=0, he or she may greatly improve the transient response.

If the ratio of input to output voltage of the circuit in FIG. 5 is further reduced (raising the output voltage for a given input) below 25%, the voltage at node 49 may switch between one-fourth and one-half of the input voltage, at a duty factor which may depend upon the duty factor of the individual switch pairs 36,37,38, and 39. When the duty factor of individual switch pairs 36,37, 38, and 39 reaches 50%, the voltage at node 49 may again be a steady dc voltage, in this case one-half of the input voltage 1. Again the output inductor 50 may be reduced in value to nearly zero. This effect may repeat again at a duty factor of individual switch pairs 36,37,38, and 39 of 75%, where the voltage at node 49 becomes three-quarters of the input voltage 1. Thus the equation for the ripple reduction from that of ripple current 5 for the simple buck converter of FIG. 1 becomes, in general, $$\eta = \frac{NV_{in} - MV_{out}}{V_{in} - V_{out}},$$

where N is the number of individual switch pairs and M is an integer taking on the discrete values 1,2,3, . . . (N−1). When $NV_{in}-MV_{out}$ is near to zero, a great reduction in the value of the filter inductor may be possible with a concomitant improvement in transient response of the converter. This may occur once for the system of FIG. 4, three times for the system of FIG. 5, and in general (N−1) times for a system of N converters. FIG. 7 shows a different configuration of combining transformers and switch pairs, resulting in yet another embodiment of the present invention. Here the nodes 55, 56, 57, and 58 from four switch pairs may be connected as shown in the figure to create an output voltage through combiner transformers 59, 60, 61, and 62, each of which may have a turns ratio of 1:1 (that is, the number of turns on the primary and secondary winding are the same). Because of this 1:1 turns ratio, the voltages across the two windings of transformer 59 may be the same, which is to say:

$$V_{67}-V_{66}=V_{55}-V_{63},$$

where $V_{67}$ is the voltage at node 67, $V_{66}$ is the voltage at node 66, and so on. Similarly for transformer 60:

$$V_{67}-V_{63}=V_{56}-V_{64}$$

And for transformer 61:

$$V_{67}-V_{64}=V_{57}-V_{65}$$

And finally for transformer 62:

$$V_{67}-V_{65}=V_{58}-V_{66}$$

Adding these equations together yields the single equation:

$$4V_{67}=V_{55}+V_{56}+V_{57}+V_{58}$$

Or $$V_{67}=\tfrac{1}{4}(V_{55}+V_{56}+V_{57}+V_{58})$$

Assuming the switch pairs connected to nodes 55, 56, 57, and 58 are driven in multiphase as in the case of the embodiment shown in FIG. 5, the resulting waveforms are shown in FIG. 8, which upon inspection are the same as those of FIG. 6. Therefore all of the comments regarding the embodiment of FIG. 5 may apply as well to the embodiment of FIG. 7. Thus the embodiment of FIG. 7 may permit the reduction of the value of inductor 68 in the same manner and to the same extent as does the embodiment of FIG. 5.

It may be observed that, while FIG. 7 shows a certain pleasing symmetry, there may be more free variables than are required in the equations for the circuit. That is, $V_{63}$, $V_{64}$ and $V_{65}$ are all free to be established at any ac voltage so long as the average of that voltage is the same as the other nodes connected to the combining transformers. Therefore one might simply connect one of the switch pairs directly to one of these nodes and the output voltage directly to another, and doing so eliminates one of the transformers. This configuration is shown in FIG. 9.

The concept of the embodiment of FIG. 9 resulting in the same performance as the embodiment of FIG. 7 may be seen by writing the equations of the transformer nodes in the same way as before. For transformer 59 in FIG. 9:

$$V_{67} - V_{58} = V_{55} - V_{63}$$

where as before $V_{67}$ is the voltage at node 67, $V_{58}$ is the voltage at node 58, and so on. Similarly for transformer 60:

$$V_{67} - V_{63} = V_{56} - V_{64}$$

And for transformer 61:

$$V_{67} - V_{64} = V_{57} - V_{67}$$

Again adding these three equations yields the result:

$$V_{67} = \frac{1}{4}(V_{55} + V_{56} + V_{57} + V_{58})$$

This may be the same as for the four transformer case and so the remarks made for the embodiment of FIGS. 5 and 7 may be as well applied to the embodiment of FIG. 9.

Yet another embodiment, using transformers with a 1:4 ratio may be seen in FIG. 10. Here the secondaries of transformers 73, 74, 75 and 76 may be connected in series to form an output voltage to be applied to the output filter. As before one may write an equation for each of the transformers to find the circuit operation. Alternatively, for this configuration one may note that the output of the combining transformers at node 81 may be simply the sum of the outputs of the secondary voltages added to the voltage at the common node 77. That is, mathematically, $$V_{81} = V_{77} + \frac{1}{4}(V_{72} - V_{77}) + \frac{1}{4}(V_{71} - V_{77}) + \frac{1}{4}(V_{70} - V_{77}) + \frac{1}{4}(V_{69} - V_{77}), \text{ or}$$

$$V_{81} = \frac{1}{4}\sum_{n=69}^{n=72} V_n,$$

which is the same result as for the other embodiments in FIGS. 5, 7, and 9, and so the circuit performance for this embodiment using 1:4 transformers may be the same as the embodiments using 1:1 transformers. In analogy with the case of FIG. 7, one of the transformers may be eliminated if it is noted that the voltage at node 77 is undefined (i.e., could be any ac voltage with a dc component equal to the output voltage), and might as well be made equal to one of the switched nodes. This is shown in FIG. 11, where the output voltage may be seen to be, as before, the sum of the secondary voltages added to the voltage at the common mode, which in this case is $V_{72}$:

$$V_{81} = V_{72} + \frac{1}{4}(V_{71} - V_{72}) + \frac{1}{4}(V_{70} - V_{72}) + \frac{1}{4}(V_{69} - V_{72}),$$

which again reduces to $$V_{81} = \frac{1}{4}\sum_{n=69}^{n=72} V_n.$$

Thus the equations of performance and the waveform of the voltage applied to the output inductor 82 in FIG. 11 may be the same as that for the other embodiments of four phase power converters according to the present invention, namely FIGS. 5, 7, 9 and 10.

In general, one may combine N switch pairs with N−1 transformers, and it will be seen by extension that a reduction in the ripple current in the output inductor may be achieved by a factor of:

$$\eta = \frac{NV_{in} - MV_{out}}{V_{in} - V_{out}}$$

where N is the number of individual switch pairs and M is an integer taking on the discrete values 1,2,3, . . . (N−1). This reduction in ripple current permits the designer to reduce the value of the output inductor by the same amount, to return the ripple current back to its original value. Further to this principle, when ($NV_{in} - W_{out}$) is near zero, a great reduction in the value of the filter inductor is possible with a concomitant large improvement in transient response of the converter. This will occur in general (N−1) times for a system of N converters as the ratio of output to input voltage is varied.

It should be noted that the above descriptions and the waveforms in FIGS. 4, 6 and 8 assume that the source impedance of the combined waveform at the point of application to the output filter inductor (node 30 in FIG. 4, node 49 in FIG. 5, node 67 in FIGS. 7 and 9, and node 81 in FIGS. 10 and 11) is low compared to the impedance of the output filter and load placed on the converter. That is to say, the on resistance from drain to source ($R_{ds(on)}$) of the switching devices as reflected to those nodes should be low compared to load resistance 5, and the leakage inductance of the combining transformers must be small compared to the output inductance. In general, the former inequality will be approximately valid because otherwise too large a fraction of the input power will be lost in the switching devices. It may be, however, that it is inconvenient, difficult, or costly to implement the combining transformers such that their individual leakage inductances are small compared to the desired value of output filter inductance. In this case the inductance of the output filter inductor (31 in FIG. 4, 52 in FIG. 5, 68 in FIGS. 7 and 9, and 82 in FIGS. 10 and 11) may be reduced by the effective value of the leakage inductance at the combining node (node 30 in FIG. 4, node 49 in FIG. 5, node 67 in FIGS. 7 and 9, and node 81 in FIGS. 10 and 11). If this is done, the waveforms of the voltage at the combining node will not be as shown in the figure, because of the possible distorting effect of the combining transformers' leakage inductance, but circuit operation and the current in inductor 31 in FIG. 4, 52 in FIG. 5, 68 in FIGS. 7 and 9, or 82 in FIGS. 10 and 11 will be the same as that of the circuit with ideal transformers and the appropriate value of output inductance. In this way compensation may be made of the non-ideal nature of the combining transformers.

It should be pointed out, however, that the coupling coefficient of the combining transformers should be adequate; that is, that the leakage inductance is much smaller than the magnetizing inductance, and that the cancellation of the flux in the transformer cores is adequate to prevent saturation of the magnetic material, in order that the circuit operate properly.

Also, while the discussion above is directed to a system of buck converters, the invention applies as well to any collection of power conversion stages.

The foregoing discussion and the claims which follow describe the preferred embodiments of the invention. Particularly with respect to the claims it should be understood that changes may be made without departing from their essence. In this regard it is intended that such changes would still fall within the scope of the present invention. It is simply not practical to describe and claim all possible revisions which may be accomplished to the present invention. To the extent such revisions utilize the essence of the invention each would naturally fall within the breadth of protection accomplished by this patent. This is particularly true for the present invention since its basic concepts and understandings are fundamental in nature and can be applied in a variety of ways to a variety of fields.

In general, this invention can be embodied in a variety of ways. In addition, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of a "switch" should be understood to encompass disclosure of the act of "switching"—whether explicitly discussed or not—and, conversely, were there only disclosure of the act of "switching", such a disclosure should be understood to encompass disclosure of a "switch." Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. All references listed in any information disclosure filed with and/or for the application are hereby incorporated by reference, however, as to each of the above, to the extent that such information or statements incorporated by reference might be considered inconsistent with the patenting of this/these invention(s) such statements are expressly not to be considered as made by the applicant(s). Further, the disclosure should be understood to include support for each feature, component, and step shown as separate and independent inventions as well as the various combinations and permutations of each.

In addition, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible in countries such as Australia and the like.

We claim:

1. A method of powering electronic circuitry comprising the steps of:
   a. providing an input voltage;
   b. switching said input voltage with at least two electronic switches operating at a frequency, each of said electronic switches having an on time, during which a voltage across said electronic switch is substantially zero, an off time, during which a current through said electronic switch is substantially zero, and a transition time between said on time and said off time which is substantially less than said on time and said off time;
   c. producing switched waveforms from said at least two electronic switches;
   d. combining said switched waveforms in a network to produce a voltage waveform which is at substantially all times the algebraic mean of said switched waveforms; and
   e. applying said voltage waveform to a filter to produce an output voltage which is substantially without time variation.

2. A method of powering electronic circuitry comprising the steps of:
   a. providing an input voltage;
   b. switching said input voltage with at least two power conversion stages each comprising at least two electronic switches operating at a frequency, each of said electronic switches having an on time, during which a voltage across said electronic switch is substantially zero, an off time, during which a current through said electronic switch is substantially zero, and transition time between said on time and said off time which is substantially less than said on time and said off time,
   c. producing switched waveforms from said at least two electronic switches;
   d. combining said switched waveforms in a network to produce a combined current output, such that electrical current flowing through said power conversion stages is at all times equalized; and
   e. applying said combined current output to a filter to produce an output voltage which is substantially without time variation.

3. A multiphase power converter comprising:
   a. at least two power conversion stages each comprising:
      at least two electronic switches operating at a frequency, each of said electronic switches having an on time, during which a voltage across said electronic switch is substantially zero, an off time, during which a current through said electronic switch is substantially zero, and a transition time between said on time and said off time which is substantially less than said on time and said off time, said at least two electronic switches producing switched waveforms;
   b. a network of combining elements which combine said switched waveforms into a combined voltage waveform which at substantially all times comprises the algebraic average mean of said switched waveforms; and
   c. an output filter which converts said combined waveform into an output voltage which is substantially without time variation.

4. A multiphase power converter comprising:

a. at least two power conversion stages each comprising: at least two electronic switches operating at a frequency, each of said electronic switches having an on time, during which a voltage across said electronic switch is substantially zero, an off time, during which the current through said electronic switch is substantially zero, and transition time between said on time and said off time which is substantially less than said on time and said off time, said at least two electronic switches producing switched waveforms;

b. a network of combining elements which combine said switched waveforms such that electrical current flowing through said at least two power conversion stages is at all times equalized; and c. an output filter which converts said combined waveform into an output voltage which is substantially without time variation.

5. A multiphase power converter as described in claims 3 or 4 wherein said at least two power conversion stages are buck converters.

6. A multiphase power converter as described in claims 3 or 4 wherein said network of combining elements are transformers.

7. A multiphase power converter as described in claims 3 or 4 wherein said output filter comprises a series combination of an inductor and a capacitor.

8. A multiphase power converter as described in claims 7 wherein the ratio of a ripple voltage across said inductor to an input voltage is smaller by a factor equal to the number of said at least two power conversion stages.

9. A multiphase power converter as described in claims 3 or 4 wherein a ripple current in each of said power conversion stages alternates with a period less than the sum of said on time and said off time.

10. A multiphase power converter as described in claims 3 or 4 wherein a ripple current in each of said power conversion stages has an amplitude smaller than a ripple current in said output filter.

* * * * *